(No Model.)

P. MURRAY, Jr.
DIFFERENTIAL PULLEY BLOCK.

No. 260,220. Patented June 27, 1882.

Witnesses:
Walter Fowler
Warren Parsons

Inventor:
Peter Murray Jr.
per Cox and Cox
his Attorneys.

UNITED STATES PATENT OFFICE.

PETER MURRAY, JR., OF NEWARK, NEW JERSEY, ASSIGNOR OF ONE-HALF TO THOMAS J. DENIS, OF SAME PLACE.

DIFFERENTIAL PULLEY-BLOCK.

SPECIFICATION forming part of Letters Patent No. 260,220, dated June 27, 1882.

Application filed March 30, 1881. (No model.)

*To all whom it may concern:*

Be it known that I, PETER MURRAY, Jr., of Newark, in the county of Essex and State of New Jersey, have invented a new and useful Improvement in Differential Pulley-Blocks, &c., of which the following is a specification, reference being had to the accompanying drawings.

The invention has relation to an improvement in differential pulley-blocks; and it consists in the elements hereinafter specifically described, and particularly pointed out in the claim.

The object of the invention is to produce an effectual, simple, and durable differential pulley-block which may be successfully used for lifting weighty bodies.

The pulley-block which is the subject of this application is an improvement upon the pulley which was patented to me in Great Britain on the 16th of September, 1870; but in this application I shall only seek to protect the improvements without embodying anything shown in the foreign patent, so that the life of the patent which may be granted upon this application will not be limited by the foreign patent. The improvements are marked and a great advance in the art, and I shall limit myself to them exclusively.

Figure 1:
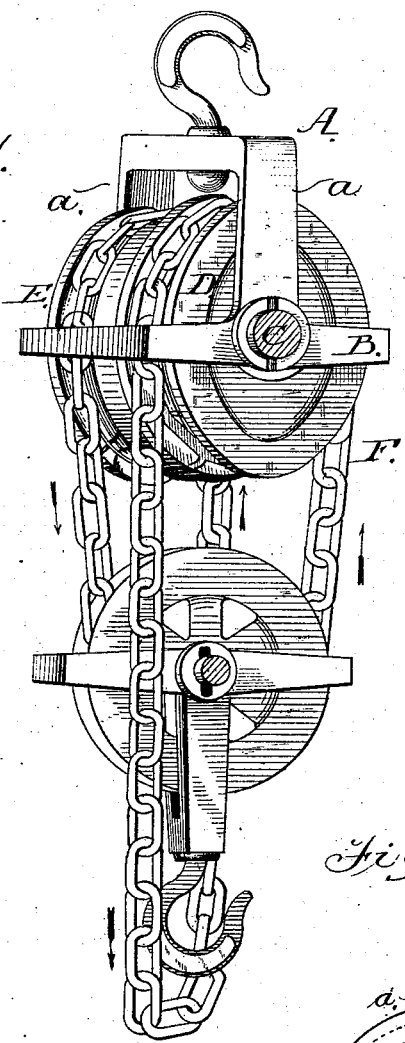
Figure 2:
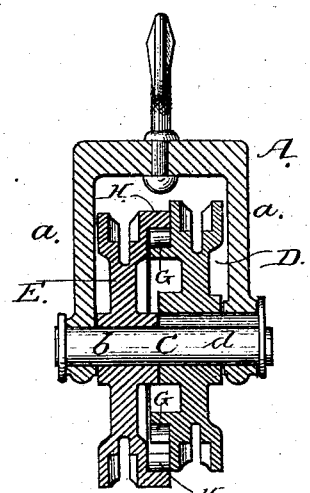
Figure 3:
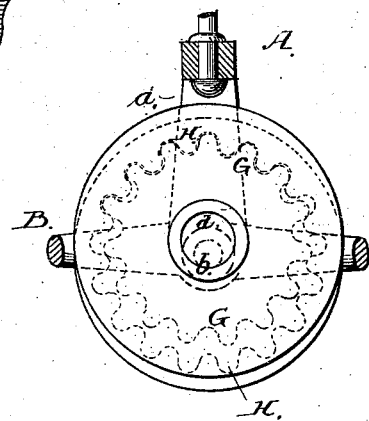

Referring to the accompanying drawings, Figure 1 is a perspective view of a block embodying the invention. Figure 2 is a central vertical longitudinal section of same; and Fig. 3 is a view of the end of the pulley, the teeth of the separate wheels being shown by dotted lines and the pulley being shown in section.

A indicates the pulley-frame, which is of appropriate construction, having a hook at its upper end, side arms, *a*, extending downward on each side of the wheels, and the part B, which encircles the wheels at about their horizontal center.

In the lower ends of the arms *a* is journaled the axle C, which is constructed of greater diameter at one end than at the other, the smaller end, *b*, being formed eccentrically to the larger end *d*.

Upon the axle C are placed the sheaves or pulley-wheels D E, the peripheries of which are of suitable conformation to receive the link-chain F, the wheel D being placed upon the larger end of the axle and the wheel E upon the smaller end thereof.

The wheel D has upon its inner face the annular externally-toothed rim G, and the wheel E has supplied upon its inner face the annular rim H, which is toothed internally, and is of sufficient size to receive the annular rim G, as indicated in Fig. 3.

The rim H has a greater number of teeth than the rim G, and the two rims are retained in contact at their upper portion by reason of the wheel D being mounted upon the larger end of the axle C, whereby its center is elevated above the center of the wheel E, and the contact of the two wheels at their upper portion thus effectuated.

The axle C is stationary, and the wheels D E revolve upon the same, in the same direction, on fixed centers.

The construction is simple, efficient, and easily understood. The two sheaves being rotated in the same direction upon fixed centers, the sheave E will advance a distance equal to the difference between the number of teeth in the rims G H with each revolution upon the axle. The smaller the difference in the number of teeth between the two rims the greater will be the power and the less the spread.

I employ a single endless chain, which is looped over the sheaves D E and over the sheaves of an auxiliary block carrying a hook, as shown in Fig. 1.

What I claim as my invention, and desire to secure by Letters Patent, is—

In a differential pulley-block, the frame A, in which is mounted the axle C, one end of which is smaller and formed eccentrically to the other, as shown, in combination with the wheels D E, having toothed rims upon their inner faces, by which they are connected together and have a simultaneous differential movement, the wheel E being mounted upon the larger end of the axle and the wheel D upon the smaller, whereby the two wheels are retained in gear at a single point and revolve together in one direction upon fixed centers, substantially as set forth.

In testimony that I claim the foregoing improvement in differential pulley-blocks, &c., as above described, I have hereunto set my hand this 29th day of March, 1881.

PETER MURRAY, JR.

Witnesses:
CHAS. C. GILL,
JOSEPH H. NEWTON.